United States Patent [19]

Kraus et al.

[11] Patent Number: 5,400,646
[45] Date of Patent: Mar. 28, 1995

[54] FLUID CONTAINMENT MONITORING SYSTEM

[75] Inventors: Donald A. Kraus, Washington; Leale E. Streebin, Norman; John E. Fagan, Norman; Anthony W. Howl, Norman, all of Okla.

[73] Assignee: MEPCO, Inc., Norman, Okla.

[21] Appl. No.: 148,081

[22] Filed: Nov. 4, 1993

Related U.S. Application Data

[63] Continuation-in-part of Ser. No. 954,091, Sep. 30, 1992, abandoned.

[51] Int. Cl.6 .............................................. G01M 3/32
[52] U.S. Cl. ...................................... 73/49.2; 340/605
[58] Field of Search ............... 73/49.2, 40.5 R, 49.1; 340/605

[56] References Cited

U.S. PATENT DOCUMENTS

| | | | |
|---|---|---|---|
| 3,623,629 | 11/1971 | Hendershot | 220/63 R |
| 4,524,609 | 6/1985 | Sharp | 73/49.2 |
| 4,653,312 | 3/1987 | Sharp | 73/49.2 |
| 4,672,366 | 6/1987 | Butts | 340/605 |
| 4,686,638 | 8/1987 | Furuse | 73/49.2 |
| 4,696,186 | 9/1987 | Sharp | 73/49.2 |
| 4,796,676 | 1/1989 | Hendershot et al. | 141/83 |
| 4,836,710 | 6/1989 | Sawada | 405/54 |
| 4,993,256 | 2/1991 | Fukuda | 340/605 |
| 5,072,623 | 12/1991 | Hendershot | 73/49.2 |
| 5,117,677 | 6/1992 | Hendershot et al. | 73/49.2 |
| 5,184,504 | 2/1993 | Spring | 73/49.2 |

FOREIGN PATENT DOCUMENTS

| | | | |
|---|---|---|---|
| 1150248 | 6/1963 | Germany . | |
| 2629369 | 6/1978 | Germany | 73/49.2 |
| 0211836 | 11/1984 | Japan | 73/49.2 |
| 0247132 | 12/1985 | Japan | 73/49.2 |

OTHER PUBLICATIONS

Exhibit A is a packet of materials from MEPCO, published Oct. 1, 1991 at the Petroleum Marketers Institute Convention and Trade Show. The packets includes:
Exhibit A (1) Newsletter titled "Concerns," disclosing a schematic of an automatic monitoring system.
Exhibit A (2) Information paper titled, "Relating the AMUST TM System to 40 CFR Part 280".
Exhibit A (3) Article titled, "Distributorships Now Available," disclosing a schematic of a leak deetection system.
Exhibit A (4) Map showing prospective distributor sites.
Exhibit A (5) Paper titled "MEPCO, Incorporated Distributor Training Program for AMUST TM UST Leak Detection and Monitoring System".
Exhibit A (6) Brochure titled, "AMUST Protects Your Investment While Protecting The Environment Around The Clock," disclosing a schematic of a double walled container wherein one wall is a flexible bladder.
Exhibit A (7) An installation schematic of an automatically monitoring underground storage tank.
Exhibit A (8) Paper titled, "Q&A About MEPCO, Inc., Products . . . ".
Exhibit A (9) Paper titled, "Environmental Issues and AMUST TM Solutions".
Exhibit A (10) Paper titled, "Company Background-/MEPCO, Inc.".
Exhibit A (11) Paper titled, "Key Personnel/MEPCO, Inc.".
Exhibit B is a brochure titled, "FITS Flexible Inner Tank System," published by World Enviro Systems, Inc., in 1988.

Primary Examiner—Hezron E. Williams
Assistant Examiner—Michael J. Brock
Attorney, Agent, or Firm—Dunlap & Codding

[57] ABSTRACT

An electronic monitoring system to accurately measure a vacuum in an interstice between inner and outer walls of a dual-wall container or pipe which allows highly accurate analysis of vacuum differential to discover and confirm a leak in either the inner or outer walls of the container or pipe within minutes.

20 Claims, 6 Drawing Sheets

FLUID CONTAINMENT MONITORING SYSTEM

CROSS-REFERENCE TO RELATED APPLICATIONS

This application is a continuation-in-part of U.S. application Ser. No. 07/954,091, filed Sep. 30, 1992, entitled "Fluid Containment Monitoring System", now abandoned.

FIELD OF THE INVENTION

The present invention relates to the detection and prevention of leaks from containers having double walls or an interstitial space.

SUMMARY OF THE INVENTION

The present invention is an electronic monitoring system for double walled containers such as fuel tanks and pipelines. The invention includes a vacuum source for lowering the pressure in an interstice between inner and outer walls of a double walled container. A pressure transducer measures the pressure in the interstice at predetermined time intervals. The time interval is generally significantly less than a minute. The repetitive, measurements allow highly accurate analysis of vacuum differential to discover and confirm a leak in either the inner or outer walls of the container within minutes.

BRIEF DESCRIPTION OF THE DRAWINGS

FIG. 6 is a logic diagram of the Monitor module performed by the controller of the system of FIG. 4.

DETAILED DESCRIPTION OF THE PREFERRED EMBODIMENT

Figure 1:
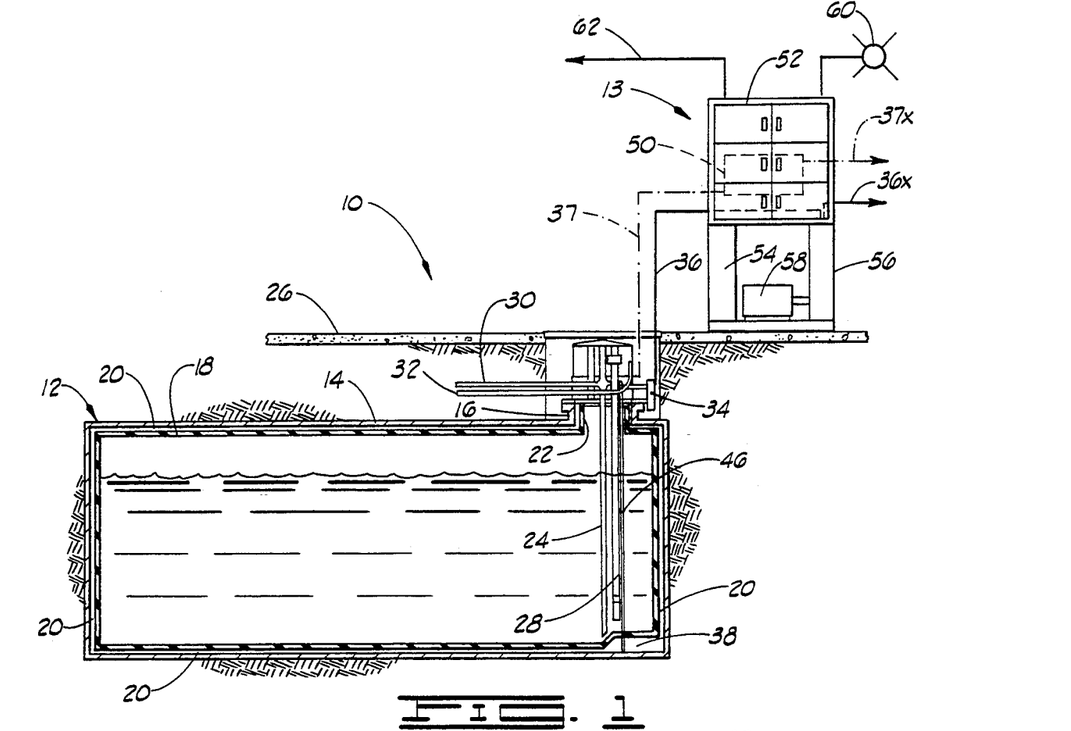
FIG. 1 is a partly sectional, partly diagrammatic view of a fluid containment monitoring system constructed in accordance with the present invention.

Referring now to the drawings in general, and to FIG. 1 in particular, shown therein and designated by the general reference number 10 is a tank system constructed in accordance with the present invention. The tank system 10 includes a double walled fluid container 12 and a control system 13.

The fluid container 12 is a double walled fluid container having an interstice between the outer and inner walls of the container. Common double walled containers include above and below ground storage tanks, as well as pipes.

While the control system 13 may be used to monitor any interstitial space, preferably the control system 13 is used with a bladder type, double walled container. Various embodiments of such containers are disclosed in U.S. Pat. No. 4,796,676, which is hereby incorporated by reference.

As illustrated by FIG. 1, the double walled container 12 has a outer tank 14 with a manway 16 extending from the upper side thereof. A bladder 18 forms the inner wall of the double walled container 12 and is shaped such that an interstice 20 is formed between the tank 14 and the bladder 18.

The bladder 18 has a neck 22 which mates with the manway 16 and is sealed in a substantially air-tight manner to the manway 16. With this arrangement, a negative pressure may be established and maintained in the interstice 20.

A drop tube 24 extends through the manway 16 to a lower area within the bladder 18. The drop tube 24 is utilized to deliver product into the bladder 18 from a tanker truck or the like at the surface 26.

A supply line 28 also extends through the manway 16 to a lower area within the bladder 18. Outside the product tank 12, the supply line 28 is connected to piping 30 for delivery of product to product dispensing pumps (not shown).

Vent line 32 is connected to a vertical riser (not shown), which is usually attached to a building or other structure. The purpose of the vent line 32 is to maintain atmospheric pressure within the bladder 18. By maintaining atmospheric pressure in the bladder 18, the vent line 32 prevents high and low pressures which may be caused by filling or emptying the bladder 18.

The interstice 20 of the product tank 12 is connected to the control system 13 through a liquid trap 34, a tank valve Vx (not shown in FIG. 1), pneumatic line 36 and a manifold (not shown in FIG. 1). A float valve (not shown) is typically provided with the liquid trap 34 to prevent liquid from being drawn into the pneumatic line 36.

A differential pressure transducer DPx (not shown in FIG. 1) provides the differential pressure across the tank valve. A differential pressure transducer of the type utilized in this invention is commercially available from ServoFlo Corporation in Lexington, Mass.

Electric lines 37 extend from the manway 16 to the control system 13. The electric lines 37 provide connections for the tank valve Vx, the differential pressure transducer DPx and the liquid sensor LQx with the control system 13.

Typically, the container 12 has a condensate sump 38, which is the lowest point in the double walled container 12. With this construction, any liquid in the interstice 20 gravity feeds into the condensate sump 38 of the container 12.

Figure 2:
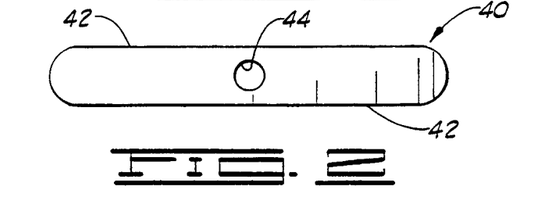
FIG. 2 is a top plan view of the sump plate of the fluid containment monitoring system shown in FIG. 1.
Figure 3:
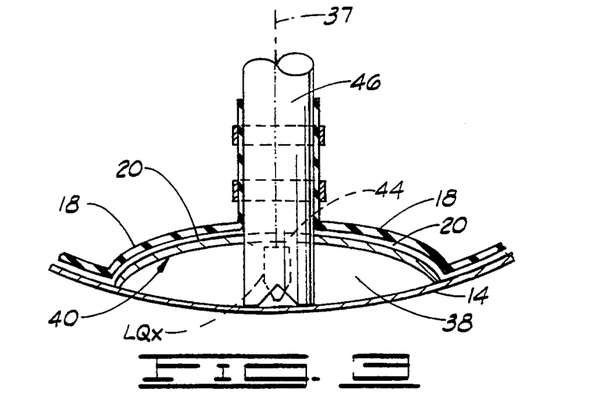
FIG. 3 is a partly sectional view of the sump area of the system shown in FIG. 1.

The condensate sump 38 is typically provided by positioning a sump plate 40 between the bladder 18 and the tank 14. As illustrated by FIGS. 2 and 3, the sump plate 40 is basically an elongated plate which is curved between side edges 42. A sump hole 44 extends through the sump plate 40 at a medial area of the sump plate 40.

As best seen in FIG. 3, the curved shape of the sump plate 40 defines the condensate sump 38 between the tank 14 and the bladder 18. A sump tube 46 extends through the manway 16 to the bottom of the double walled container 12. The sump tube 46 is tightly sealed to the bladder 18 at the bottom of the double walled container 12 and opens into the interstitial space 20 between the tank 14 and the bladder 18.

A liquid detection sensor LQx is positioned at the bottom of the sump tube 46 to detect the presence of any liquid in the condensate sump 38. A suitable liquid detection sensor LQx is the SmartFish ECS1100 available from IMO Industries, Inc. in Plainville, Conn.

Upon detecting liquid, the liquid detection sensor LQx produces an electric signal. One of the electric lines 37 is connected to the liquid detection sensor LQx to carry the electric signals of the liquid detection sensor LQx to the control system 13.

Referring back to FIG. 1, the control system 13 is preferably located near the double walled container 12 for conveniently housing and protecting controls utilized by the tank system 10. The control system 13 includes a microprocessor controller 50 mounted in a housing 52. The housing 52 is supported upon legs 54 and 56.

In addition to supporting the housing 52, the leg 56 functions as a reference tank containing a reference volume of air under a reference pressure. An air compressor 58 is connected to the leg 56 to maintain the reference pressure within a predetermined operating range.

An alarm 60 and data lines 62 are operatively connected to the microprocessor controller 50. The alarm 60 may provide a visual alert, an audible alert or both. The data lines 62 may be connected to a computer display terminal and/or a modem and data transmission lines for remote monitoring of the tank system 10.

In all the drawing figures, pneumatic lines are indicated by solid lines and electric lines are designated by broken lines. Accordingly, reference numeral 37 indicates electric lines between the tank 12 and the controller 50. It should be appreciated that the electric lines 37 include lines from the tank valve Vx, the differential pressure transducer DPx, and the liquid detection sensor LQx.

On the other hand, the pneumatic line 36 between the interstice 20 and the reference tank 56 is indicated in solid lines. As described hereinbelow, the liquid trap 34, the tank valve Vx and the differential pressure transducer DPx are connected to the pneumatic line 36.

It should be appreciated that the controller 50 may be utilized to monitor one or a plurality of tanks 12. Pneumatic line 36x and the electric lines 37x are representative of connections between the controller 50 and additional tanks being monitored by the controller 50.

Figure 4:
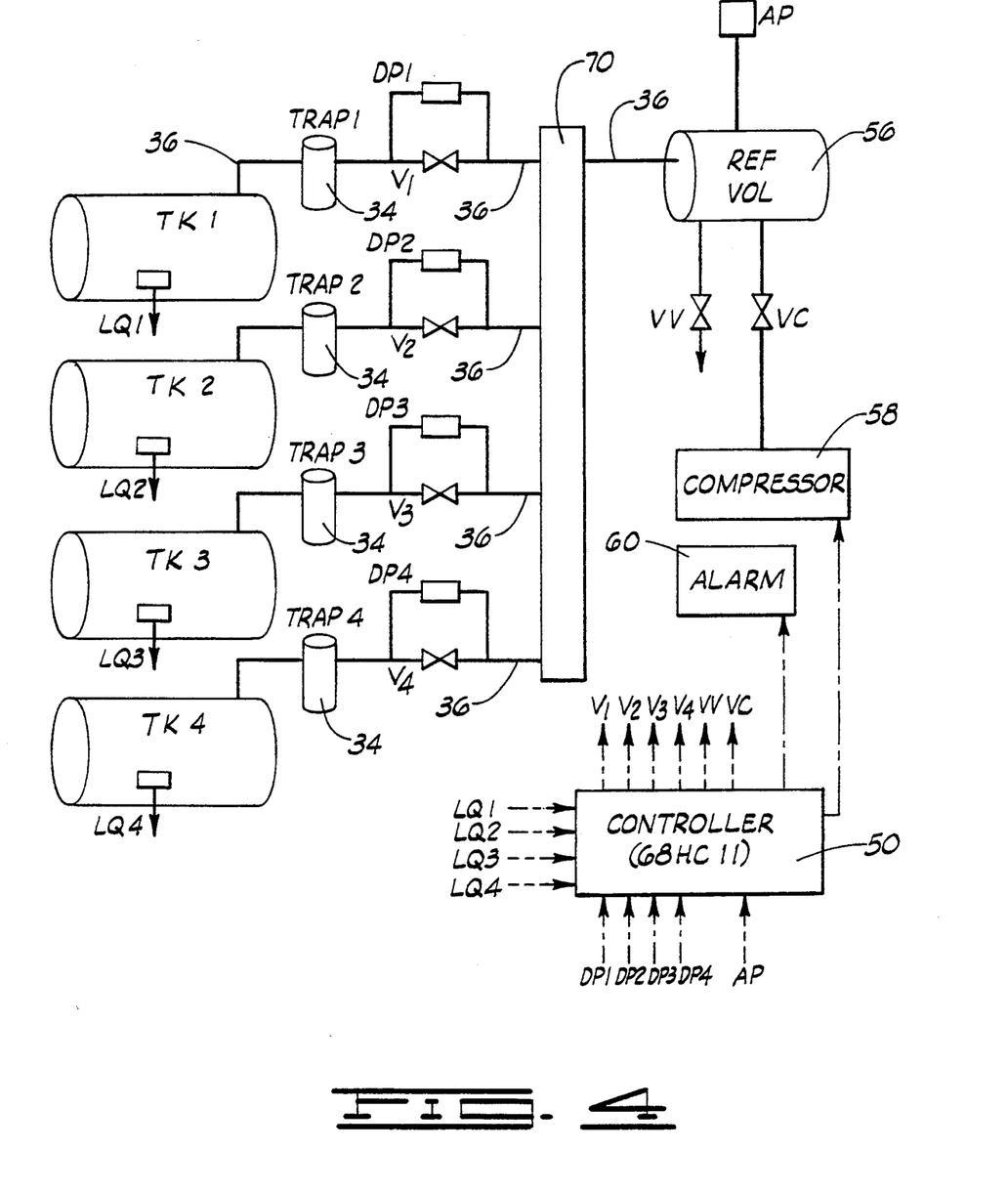
FIG. 4 is a schematic view of the fluid containment monitoring system arranged to monitor four product tanks.

With reference now to FIG. 4, shown therein is a system used to monitor four product tanks TK1, TK2, TK3 and TK4. Each product tank TK1–TK4 has a corresponding liquid trap 34, tank valve V1–V4 and differential pressure valve DP1–DP4. The pneumatic lines 36 of all four product tanks TK1–TK4 are connected to a manifold 70, which in turn is connected to the reference tank 56.

An absolute pressure transducer AP is connected to the reference tank 56 to monitor the absolute pressure of the reference tank 56. A vent valve VV is connected to the reference tank 56 to vent the system 10 to the atmosphere when the absolute pressure of the system 10 is greater than the desired operating range.

A compressor valve VC is located between the compressor 58 and the reference tank 56. When the absolute negative pressure of the system 10 increases above the desired operating range, the compressor valve VC is opened and the compressor 58 is run to reestablish the desired negative pressure of the system 10.

As illustrated by FIG. 4, all four liquid detection sensors LQ1–LQ4, all four tank valves V1–V4, all four differential pressure transducers DP1–DP4, the vent valve VV, the compressor valve VC and the absolute pressure transducer AP are all connected to the controller 50.

The controller 50 may utilize any microprocessor having the capabilities to perform functions consistent with the operations described herein. It should be appreciated that the controller 50 comprises a microprocessor interfaced with signal conditioning circuitry for the pressure transducers, switching circuitry for control of the valves, the alarm 60 and the compressor 58, and input logic for the liquid sensors LQ1–LQ4. Suitable circuitry and logic are known in the art. A particular microprocessor which is suitable for use with the tank system 10 is the model 68HC11 microprocessor available from Motorola Corporation.

With reference now to FIGS. 5 through 8, shown therein are logic diagrams of the program modules which the controller 50 executes. The controller program includes a POWER/RESET module 81, a MONITOR module 82, an HOURLY INTERRUPT module 83 and a PURGE module 84.

Figure 5:
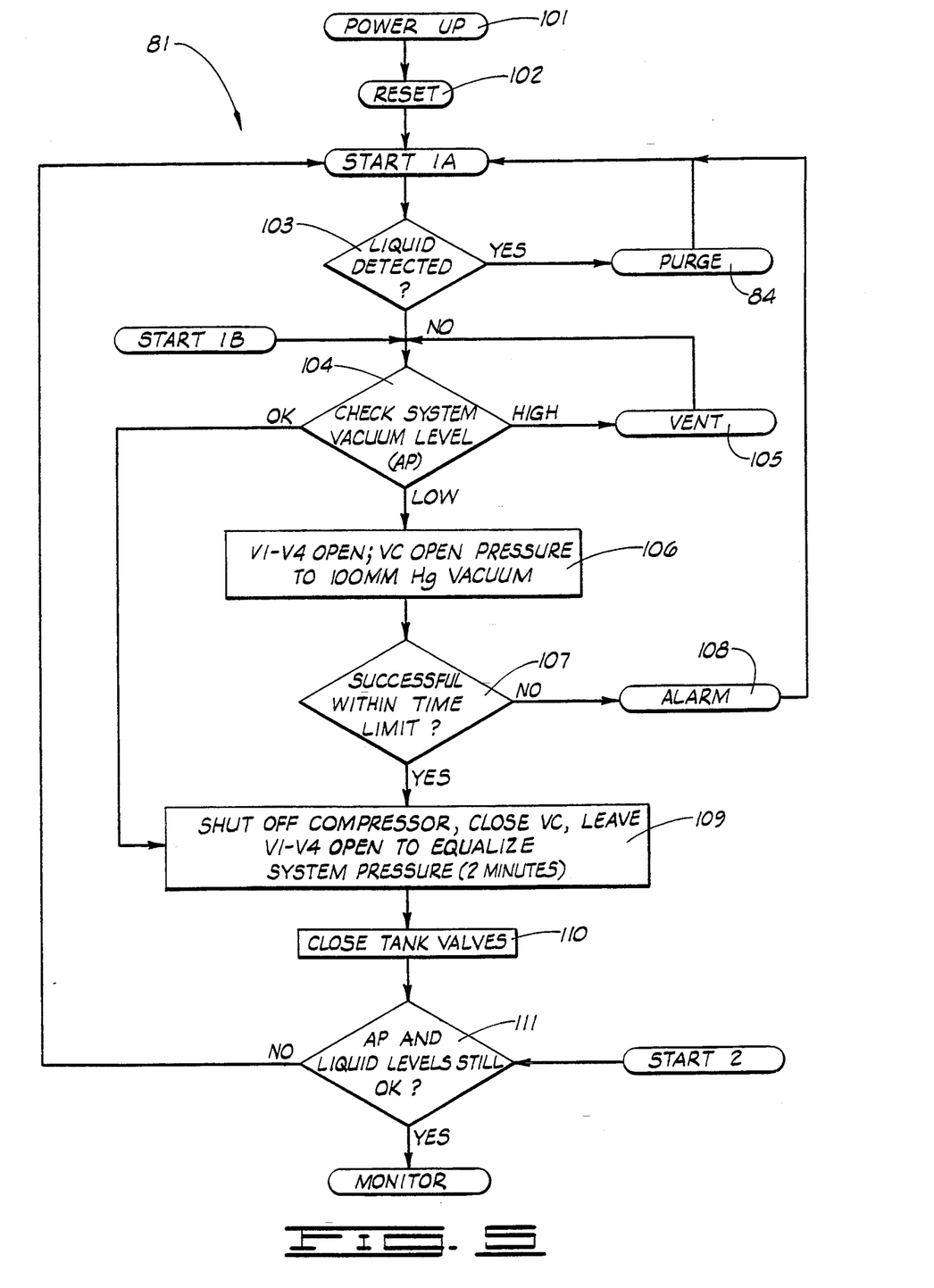
FIG. 5 is a logic diagram of the Power/Reset module performed by the controller of the system of FIG. 4.

Referring to FIG. 5, shown therein is the logic diagram of the POWER/RESET module 81. The control system 13 is first powered up and all variables and values are reset (Blocks 101 and 102). For example, RESET includes setting information such as how many tanks are to be monitored. It should be appreciated that the controller 50 executes the control program for the number of tanks which are being monitored.

At "START 1A," decision block 103 indicates that the signals of the liquid detection sensors LQ1–LQ4 are checked to see if any liquid is present in the respective condensate sumps 38. If liquid is detected, then control is transferred to the PURGE module 84.

If no liquid is detected, control proceeds to "START 1B," where the system vacuum level is checked (Block 104). If the system vacuum level is above the upper limit of the operating range, the vent valve VV and the tank valves V1–V4 are opened to vent to the atmosphere in order to lower the system vacuum level to the upper operating limit (Block 105).

If the system vacuum level is below the lower limit of the operating range, the compressor valve VC and the tank valves V1–V4 are opened and the compressor 58 is run to take the system vacuum level to the upper operating limit (Block 106). The operating range selected for the system vacuum level may vary depending on such factors as how tightly the interstice 20 is sealed and the permeability of the bladder 18 to the fluid being contained. In a typical installation, however, the lower and upper system vacuum limits are set at about 50 mm Hg negative pressure and 100 mm Hg negative pressure, respectively.

A time limit is imposed on reaching successful pressurization (Block 107). The time limit is selectable by the operator of the tank system 10 and is typically set at about 30 minutes. If successful pressurization is not achieved within the time limit set, the controller 50 actuates the alarm 60 and indicates the inability of the tank system 10 to achieve successful pressurization.

Once system pressurization is attained, the compressor 58 is shut off, and the tank valves V1–V4 remain open to equalize system pressure (Block 109). Approximately two minutes are typically allowed for pressure to equalize throughout the reference tank 56, the pneumatic lines 36 and the interstices 20 of the product tanks TK1–TK4.

After the system pressure has equalized, the tank valves V1–V4 are closed (Block 110) to isolate the interstitial pressure of each tank TK1–TK4 from the reference pressure AP of the reference tank 56. Because the differential pressure transducers DP1–DP4 are connected across each side of the corresponding tank valve V1–V4, each transducer DP1–DP4 monitors the pressure differential between the interstitial pressure of the corresponding product tank TK1–TK4 and the reference pressure AP.

The reference pressure AP and the liquid detection sensors LQ1–LQ4 are checked again (Block 111). If the reference pressure AP is too high or too low or if liquid is detected, control is transferred to "START 1A." Otherwise, control is transferred to the MONITOR module.

With reference now to FIG. 6, shown therein is the logic diagram of the MONITOR module 82. As indicated by Block 112, the first step in the MONITOR module 82 is to clear status flags for AP and DPx pressures and the DPLVL indicators.

Then the reference pressure AP is checked (Block 113). If the reference pressure AP is high (over 100 mm Hg, for example), the system 10 is vented to the atmosphere (Block 114) and control is transferred to point "START 1B" of the POWER/RESET module 81.

If the reference pressure AP is too low (under 50 mm Hg, for example), the compressor 58 is run to pressure back to the operating level (Block 115). Each time the system must be pressured back up to operating level, a counter "RPNUM" for the number of repressurizations is incremented (Block 116). Control is then transferred to "START 1B" of the POWER/RESET module.

If the reference pressure AP is neither too high nor too low, monitoring continues. At periodic time intervals, readings are obtained for AP, DP1, DP2, DP3 and DP4 (Block 117). Of course, the number of DPx readings depends upon how many product tanks TKx are being monitored.

For each time interval, an absolute pressure status flag is updated (Block 118). If the change in reference pressures AP for two successive time intervals exceeds an expected value APREF, then the corresponding status flag is set to NOT OK. The value of APREF may be set by the operator and a typical value selected for APREF is about 2 mm Hg.

Similarly, a differential pressure status flag for each differential pressure transducer DP1–DP4 is updated for each time interval (Block 118). If the change in one of the differential pressures DP1–DP4 for two successive time intervals exceeds an expected value DPREF, then the corresponding DP status flag is set to NOT OK. The value for DPREF, which may be set by the operator, is approximately 2 mm Hg for a typically tight tank system 10.

After updating the AP and DP status flags, the readings of the liquid detection sensors LQ1–LQ4 are checked (Block 119). If liquid is detected, control is transferred to the PURGE module 84.

If no liquid is detected, the status flags are checked (Block 120). If any of the status flags are NOT OK, the alarm 60 is activated to indicate a SPIKE ALARM, or sudden leak (Block 121), and control is transferred to the "START 2" point of the POWER/RESET module 81.

If all the status flags are OK, the DPLVL indicator for each tank TK1–TK4 is updated for the time interval (Block 122). If the DP1–DP4 exceeds DPMAX, then the corresponding DPLVL is set to NOT OK. The DPLVL indicator for each tank TK1–TK4 may be set to various values.

After updating the DPLVL indicators, the DPLVL indicators are checked (Block 123). If all the DPLVL indicators are OK, monitoring continues by returning control to the beginning of the MONITOR module to repeat the monitoring steps for the next time interval.

If any of the DPLVL indicators are NOT OK, the tank valves V1–V4 are opened to stabilize the differential pressure transducers DP1–DP4 (Block 124). The stack level for the DPs which exceeded the DPMAX are incremented (Block 125), the tank valves V1–V4 are closed, and monitoring continues by returning control to the beginning of the MONITOR module.

Figure 7:
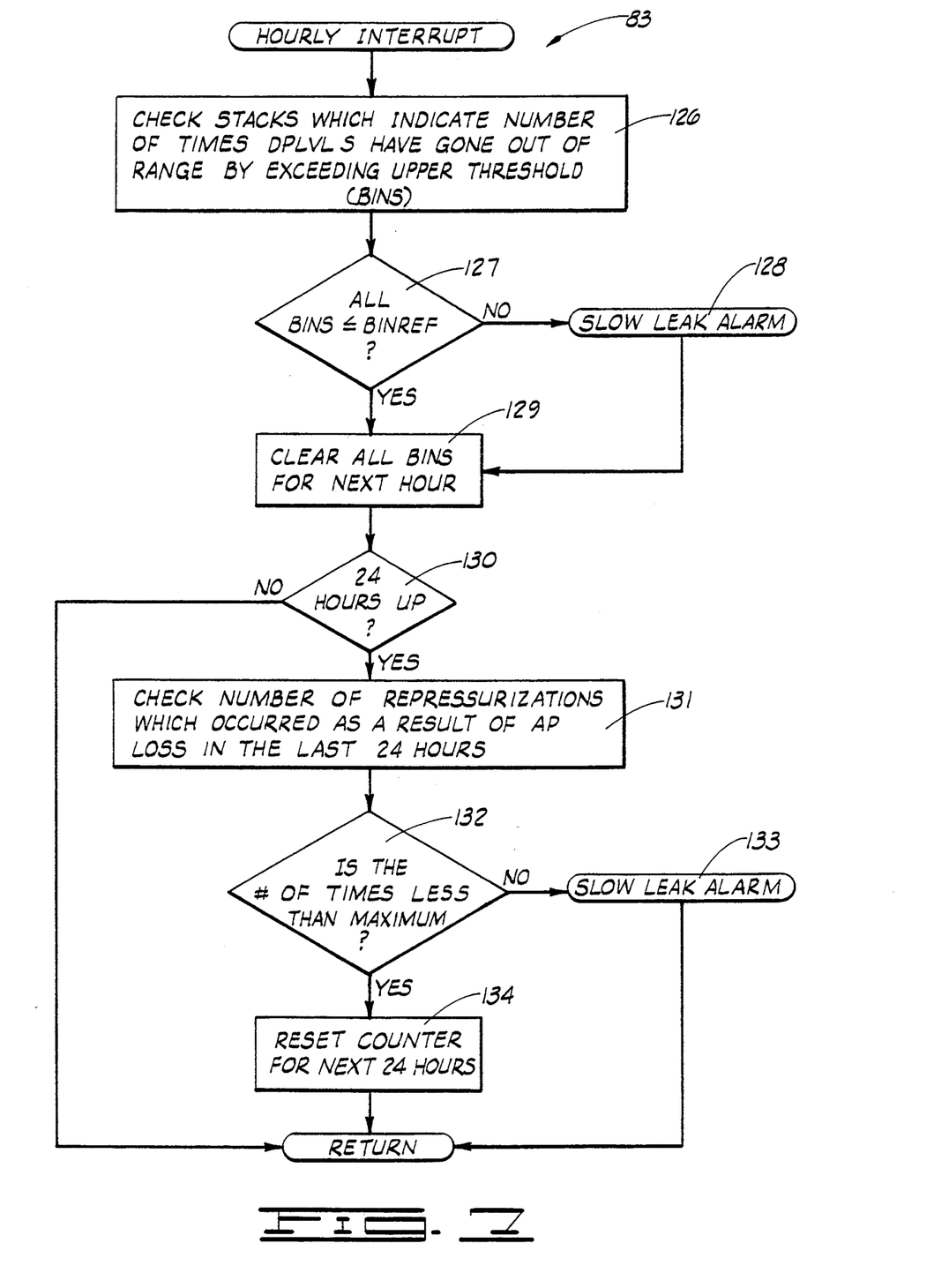
FIG. 7 is a logic diagram of the Hourly/Interrupt module performed by the controller of the system of FIG. 4.

Turning now to FIG. 7, shown therein is the logic diagram of the HOURLY INTERRUPT module 83. It should be appreciated that controller 50 executes the HOURLY INTERRUPT module 83 once every hour.

The HOURLY INTERRUPT module 83 first checks the DPx stacks to determine the number (BIN number) of times DPLVLs have exceeded the upper threshold DPxMAX (Block 126) in the past hour. If any of the BINs exceed the value of BINMAX (Block 127), the controller 50 activates the alarm 60 to indicate a SLOW LEAK (Block 128). The value for BINMAX may be selected by the operator of the tank system 10.

Typically, the controller 50 performs hundreds of iterations of the MONITOR module 82 in one hour and the value of BINMAX is set at about 2. After checking the BINs against BINMAX, all BINs are cleared for the next hour interval (Block 129).

Next the HOURLY INTERRUPT module 83 checks to see if 24 hours have expired (Block 130). If not, the HOURLY INTERRUPT module 83 returns control to the MONITOR module 82.

If a 24-hour period has expired, the number of repressurizations RPNUM which have occurred in the last 24 hours is checked (Block 131). The number of repressurizations RPNUM is compared with RPMAX, the maximum number of repressurizations expected in a 24-hour period without a slow leak. If RPNUM exceeds RPMAX (Block 132), then the controller 50 activates the alarm 60 with a SLOW LEAK indication (Block 133).

If RPNUM is less than or equal to RPMAX, then RPNUM is reset to zero for the next 24-hour period (Block 134). Control is returned to the MONITOR module 82.

Figure 8:
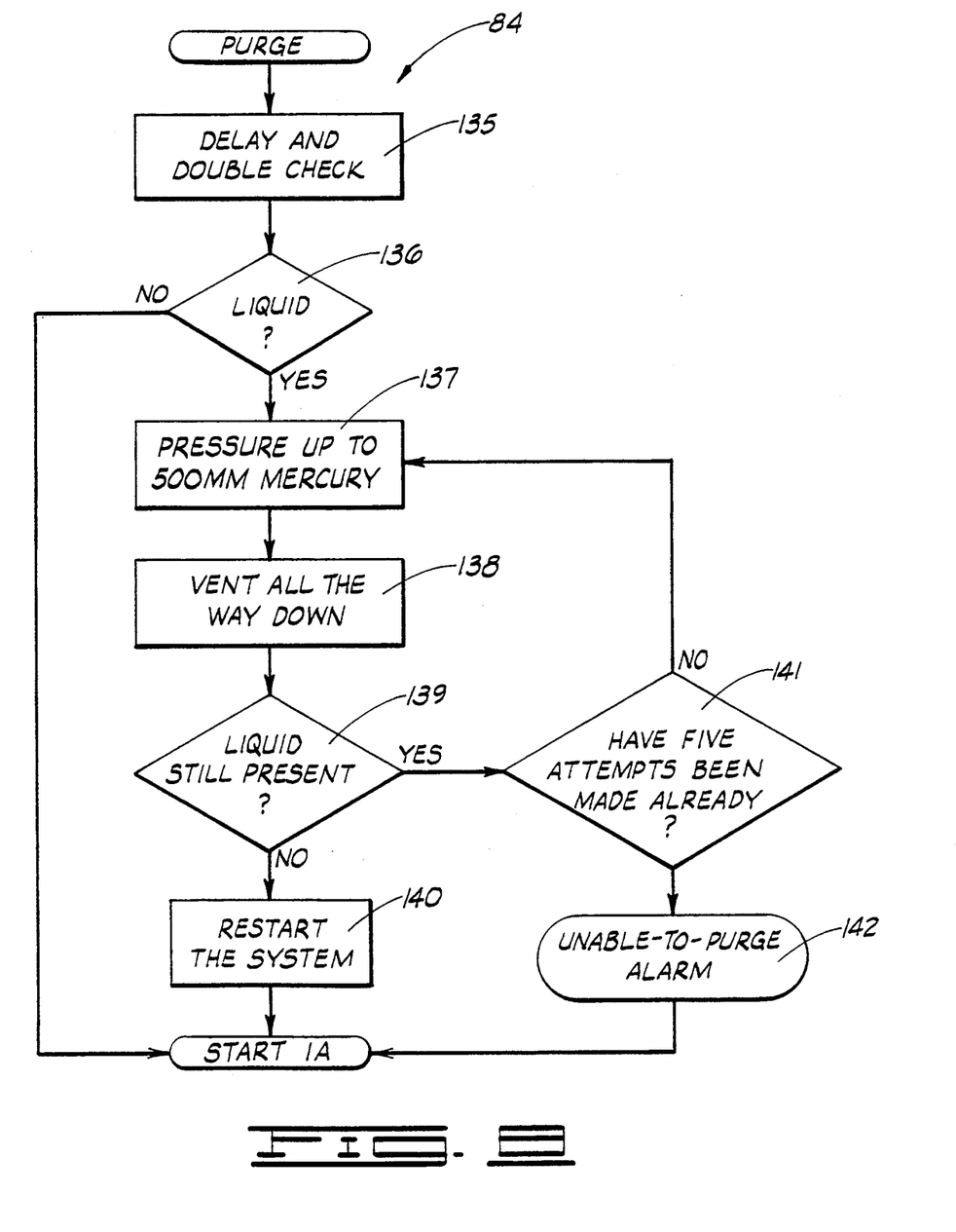
FIG. 8 is a logic diagram of the Purge module performed by the controller of the system of FIG. 4.

Referring now to FIG. 8, shown therein is the logic diagram of the PURGE module 84. It should be appreciated that the PURGE module 84 is executed by the controller 50 when liquid is detected by one of the liquid detection sensors LQ1–LQ4 in the respective condensate sump 38 of one of the tanks TK1–TK4.

The first step performed in the PURGE module 84 is to delay and to double-check that liquid is detected (Blocks 135 and 136). The amount of delay is typically in the range of a few seconds.

If the liquid detection sensor LQ1–LQ4 does not detect liquid after the delay, it is assumed that the first detection of liquid was a false reading. In this case, control transferred to the "START 1A" point of the POWER/RESET module 81.

If the liquid detection sensor LQ1–LQ4 continues to indicate the presence of liquid in the corresponding condensate sump 38, then the purging sequence continues. First, the compressor valve VC and tank valves V1–V4 are opened and the compressor 58 is operated to bring the system vacuum level to approximately 500 mm Hg (Block 137). This level of pressure is sufficient to draw liquid from the respective condensate sump 38 through the corresponding sump tube 46 and into the associated liquid trap 34.

After reaching the 500 Hg vacuum level, the vent valve VV is opened (Block 138) to vent the reference tank 56 and the system pressure to minimum operating level (typically 50 mmHg). After the system reaches minimum operating level, the readings of the liquid detection sensors LQ1–LQ4 are checked to see if liquid is still present in any of the condensate sumps 38 (Block 139).

It should be appreciated that the bladder 18 of each tank 14 is typically not completely impervious to liquid. Over a period of time, some product may permeate the bladders 18 and collect in the condensate sumps 38. Thus the presence of some liquid in the condensate sumps 38 does not necessarily indicate the presence of a leak in the tank system 10.

Accordingly, if there is no liquid in the condensate sumps 38 after liquid purging, the control system 13 is restarted by transferring control to the "START 1A" point of the POWER/RESET module 81 (Block 140).

If liquid is still present after five purge attempts (Block 141), the PURGE module 84 activates the alarm 60 and indicates an "Unable-to-Purge" condition (Block 142). Control is then transferred to the "START 1A" point of the POWER/RESET module 81.

It should be appreciated that the liquid brought into each liquid trap 34 is readily available for analysis. If the liquid is product, then the corresponding bladder 18 likely has a leak. If the liquid is water, the outer tank wall 14 probably has a leak. In case of either type of leak, no product escapes to the environment and the leaking condition is detected quickly.

The tank system 10 described hereinabove provides continuous monitoring for sudden leaks and slow leaks by analyzing pressures at each time interval, at each hour and every 24 hours. Sudden or spike leaks are detected from pressure indications almost instantaneously. Slow leaks are detected from differential pressures for an hour of monitoring or from the number repressurizations required in a 24-hour period.

In addition to this spike leak and slow leak detection capability, the tank system 10 provides liquid detection in the condensate sumps 38 of each container 12. By trapping sump liquids in a readily accessible liquid trap, the liquids may be analyzed to determine the nature of the leak.

Changes may be made in the combinations, operations and arrangements of the various parts and elements described herein without departing from the spirit and scope of the invention defined in the following claims.

What is claimed is:

1. A fluid containment and monitoring system comprising:
   a product tank having an inner wall, an outer wall and an interstice defined between the inner wall and the outer wall thereof;
   a reference tank having a reference volume therein;
   a pneumatic line connecting said reference tank with the interstice of said product tank, wherein the interstice, the reference volume and said pneumatic line define a system volume;
   a tank valve installed in said pneumatic line;
   a vacuum source connected to said reference tank for establishing a predetermined negative system pressure in the system volume when the tank valve is open;
   differential transducer means, connected to said pneumatic line, for providing a differential pressure reading between two points in said pneumatic line on opposite sides of said tank valve; and
   processor means, operatively connected to said differential transducer means, for obtaining the differential pressure reading from said transducer means at predetermined time intervals when the tank valve is closed and for analyzing changes in the differential pressure reading over time to detect fluid leakage in the inner wall or outer wall of said product tank.

2. The fluid containment and monitoring system of claim 1 wherein the inner wall of said product tank is a flexible bladder.

3. The fluid containment and monitoring system of claim 1 further comprising:
   absolute transducer means for providing an absolute pressure reading of said reference tank.

4. The fluid containment and monitoring system of claim 3 further comprising:
   processor means, operatively connected to said absolute transducer means, for obtaining the absolute pressure reading from said absolute transducer means at predetermined time intervals and for analyzing changes in the absolute pressure reading over time to detect fluid leakage in the system volume.

5. The fluid containment and monitoring system of claim 3 further comprising:
   processor means, operatively connected to said absolute transducer means, for obtaining the absolute pressure reading from said absolute transducer means at predetermined time intervals and for determining when the absolute pressure reading has risen from a predetermined first negative pressure to a predetermined second negative pressure; and
   means for evacuating said reference tank and the interstice of said product tank to the first negative pressure.

6. The fluid containment and monitoring system of claim 5 further comprising:
   processor means for counting the number of times said reference tank and the interstice of said product tank are evacuated to the first negative pressure in a predetermined time period.

7. The fluid containment and monitoring system of claim 6 further comprising:
   processor means for activating an alarm when the number of times said reference tank and the interstice of said product tank are evacuated to the first negative pressure in the predetermined time period exceeds a preset maximum therefor.

8. The fluid containment and monitoring system of claim 1 further comprising:
   a sump plate disposed in a lowermost area of the interstice of said product tank, said sump plate being arcuate to define a condensate sump in the interstice of said product tank.

9. The fluid containment and monitoring system of claim 8 further comprising:
   means, connected to said sump plate, for drawing liquid from the condensate sump and out of said product tank.

10. The fluid containment and monitoring system of claim 8 further comprising:
a liquid detection sensor disposed in the condensate sump of said product tank.

11. The fluid containment and monitoring system of claim 10 further comprising:
processor means, operatively connected to said liquid detection sensor, for activating an alarm in response to detection of liquid in the condensate sump by said liquid detection sensor.

12. A method of monitoring a fluid containment for fluid leakage, the steps of the method comprising:
providing a double-walled containment having inner walls and outer walls defining a substantially airtight interstice therebetween, the inner walls defining a product chamber for containing fluid product;
providing a reference tank having a reference volume therein;
placing the reference volume in communication with the interstice of the containment;
establishing a predetermined negative pressure within the reference volume and the interstice;
isolating the reference volume from the interstice;
measuring a differential pressure between the reference volume and the interstice at predetermined time intervals;
analyzing the differential pressure at the predetermined time intervals to detect fluid leakage in the inner or outer walls of the containment.

13. The method of claim 12 further comprising the steps of:
measuring the absolute pressure of the reference volume at predetermined time intervals; and
analyzing change in absolute pressure of the reference volume over the predetermined time intervals to detect leakage in the reference volume.

14. The method of claim 12 further comprising the steps of:
setting an upper limit of negative pressure for the reference volume;
measuring the absolute pressure of the reference volume at predetermined time intervals; and
venting the reference volume and interstice to the atmosphere when the absolute pressure of the reference volume is above the upper limit of negative pressure for the reference volume.

15. The method of claim 12 further comprising the steps of:

setting a first negative pressure and a second negative pressure for the reference volume, the first negative pressure being more negative than the second negative pressure;
measuring the absolute pressure of the reference volume at predetermined time intervals; and
evacuating the reference volume and interstice to the first negative pressure when the absolute pressure of the reference volume reaches the second negative pressure.

16. The method of claim 15 further comprising the steps of:
counting the number of times the evacuating step is performed within a predetermined time interval;
setting a maximum number of times the evacuating step should be performed in the predetermined time interval when there is no fluid leakage; and
activating an alarm when the number of times the evacuating step is performed exceeds the maximum number set therefor.

17. The method of claim 12 further comprising the steps of:
providing a sump in a lowermost portion of the interstice of the containment; and
detecting whether or not liquid is present in the sump.

18. The method of claim 17 further comprising the steps of:
providing a liquid trap fluidly communicating with the sump and the reference volume;
evacuating the reference volume and sump to a predetermined liquid purge negative pressure to draw liquid from the sump into the liquid trap when the presence of liquid is detected in the sump; and
venting the reference volume and sump to the atmosphere until the absolute pressure of the reference volume reaches a predetermined negative pressure.

19. The method of claim 18 further comprising:
setting a maximum number of iterations for performing the evacuating and venting steps; and
performing the evacuating and venting steps of claim 18 until liquid is no longer detected in the sump or until the maximum number of iterations for performing the evacuating and venting steps is reached.

20. The method of claim 19 further comprising:
activating an alarm when the maximum number of iterations for performing the evacuating and venting steps is reached.

* * * * *